C. E. ROWLAND.
PORTABLE CARRYING MEANS FOR ELECTRIC GENERATOR SETS.
APPLICATION FILED JULY 19, 1920.
1,389,903. Patented Sept. 6, 1921.
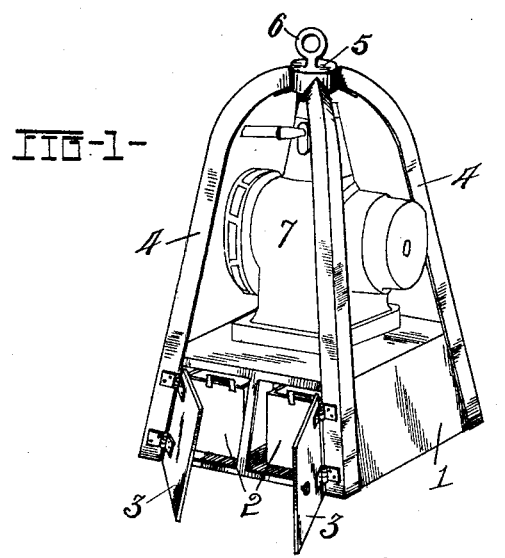
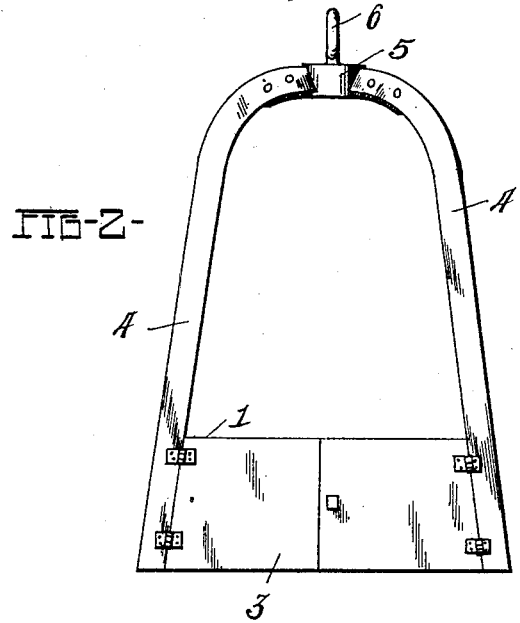
INVENTOR
Charles E. Rowland,
By Owen Owen & Crampton,
His attys.

UNITED STATES PATENT OFFICE.

CHARLES E. ROWLAND, OF TOLEDO, OHIO.

PORTABLE CARRYING MEANS FOR ELECTRIC GENERATOR-SETS.

1,389,903.   Specification of Letters Patent.   Patented Sept. 6, 1921.

Application filed July 19, 1920. Serial No. 397,382.

*To all whom it may concern:*

Be it known that I, CHARLES E. ROWLAND, a citizen of the United States, and a resident of Toledo, in the county of Lucas and State of Ohio, have made an invention appertaining to Portable Carrying Means for Electric Generator-Sets; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a compact carrying means for portable electric generator sets, and has for its object the provision of a simple, strong and inexpensive means of this character intended more particularly for use by wrecking crews on railroads to furnish light for carrying on wrecking operations at night.

The invention is fully described in the following specification, and while, in its broader aspect, it is capable of embodiment in numerous forms, a preferred embodiment thereof is illustrated in the accompanying drawings, in which,—

Figure 1 is a perspective view of a generator set embodying the invention, and Fig. 2 is a side elevation thereof with the motor-generator unit removed.

Referring to the drawings, 1 designates a hollow base forming a housing or inclosing box for a plurality of electric storage batteries 2, such base being preferably divided into separate compartments for the batteries and having doors 3 to facilitate access to the interior thereof.

The base 1, in the present instance, is of square form in horizontal cross-section, and has a frame bar or upright 4 fixed to and rising from each of its four corners in converging relation with their upper ends turned in and joined in central relation to the base by a casting or tie member 5 having an eye stud 6 on its top for engagement with a suspending hook or the like. The frame bars 4 are preferably of angle iron and coöperate with the base 1 to form a skeleton frame for receiving and carrying a motor generator unit 7 for charging the batteries 2. The motor generator rests centrally on the base to which it is bolted or otherwise suitably secured. The frame formed by the bars 4 and base may be suspended from any suitable means, such for instance as a derrick, crane or boom, or may rest on its bottom on a subjacent support, the bottom of the frame being flat for such purpose.

It is evident that the generator set and carrying means is capable of being easily transported from one place to another and is of a compact nature to adapt it for use in places not supplied with other lighting means, and it is particularly adapted and intended for use by railroads and wrecking companies for use in connection with wrecking operations.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. An electric generator set carrying means, comprising a hollow base member for receiving storage batteries and supporting a motor generator unit, and frame bars rising from the base member at spaced intervals around the same and united at their upper ends.

2. An electric generator set carrying means, comprising a hollow base member for receiving a plurality of storage batteries and for supporting a motor generator unit on its top, a plurality of frame bars rising from the base in spaced converging relation with their upper ends turned inward, a uniting member fixed to the upper ends of the bars and having a hook receiving eye to adapt the carrying means for suspension from a superposed means.

3. A carrying frame for an electric light generator set, comprising a hollow base for receiving electric storage batteries and having a flat bottom, bars rising from the base in transversely spaced converging relation and having their upper ends turned inward, a uniting member fixed to the other ends of said bars and adapted to be attached to a suspending object, said bars and base forming an inclosing frame for receiving a motor generator.

In testimony whereof I have hereunto signed my name to this specification.

CHARLES E. ROWLAND.